United States Patent
Hickman et al.

(10) Patent No.: US 12,151,445 B2
(45) Date of Patent: Nov. 26, 2024

(54) COUNTERSINKS IN THIN GAUGE THERMOPLASTIC SKINS

(71) Applicant: The Boeing Company, Chicago, IL (US)

(72) Inventors: Gregory James Schoepen Hickman, Charleston, SC (US); Aaron Ross Cowin, Dardenne Prairie, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/936,117

(22) Filed: Sep. 28, 2022

(65) Prior Publication Data
US 2024/0100793 A1    Mar. 28, 2024

(51) Int. Cl.
*B29C 51/20* (2006.01)
*B29C 51/14* (2006.01)
(Continued)

(52) U.S. Cl.
CPC .......... *B29C 70/545* (2013.01); *B29C 51/145* (2013.01); *B29C 51/20* (2013.01); *B29C 51/428* (2013.01); *B29C 65/562* (2013.01); *B29C 66/02242* (2013.01); *B29C 66/0242* (2013.01); *B29C 66/73921* (2013.01); *B29D 99/001* (2013.01); *F16B 5/0056* (2013.01); *B29C 59/022* (2013.01); *B29C 66/41* (2013.01); *B29C 66/721* (2013.01); *B29C 66/73115* (2013.01); *B29C 66/7352* (2013.01); *B29C 70/16* (2013.01); *B29K 2101/12* (2013.01); *B29K 2105/08* (2013.01); *B29L 2031/3076* (2013.01); *B29L 2031/3082* (2013.01); *B29L 2031/3085* (2013.01); *B32B 3/266* (2013.01); *B32B 3/28* (2013.01); *B32B 3/30* (2013.01); *B32B 5/024* (2013.01); *B32B 5/026* (2013.01); *B32B 7/08* (2013.01); *B32B 2260/021* (2013.01);
(Continued)

(58) Field of Classification Search
None
See application file for complete search history.

(56) References Cited

U.S. PATENT DOCUMENTS 2,945,653 A * 7/1960 Atkin ................. B64C 1/38
244/119
5,297,760 A * 3/1994 Hart-Smith ........... B64C 1/12
403/41
(Continued)

FOREIGN PATENT DOCUMENTS

DE     2944371 A  * 5/1981  ......... B29C 33/0033
DE     2944371 A1 * 5/1981  ......... B29C 33/0033
(Continued)

OTHER PUBLICATIONS

Machine Translation of DE-102010001634-A1, Aug. 2011 (Year: 2011).*
(Continued)

*Primary Examiner* — Jeffrey A Vonch
(74) *Attorney, Agent, or Firm* — Yee & Associates, P.C.

(57) ABSTRACT

A composite skin is attached to an underlying structure by fasteners that are countersunk into the structure. The composite skin comprises a thermoplastic material that has been melted and formed into a countersink in the structure using a heated tool.

20 Claims, 19 Drawing Sheets

(51) Int. Cl.

| | | |
|---|---|---|
| *B29C 51/42* | (2006.01) | |
| *B29C 59/02* | (2006.01) | |
| *B29C 65/00* | (2006.01) | |
| *B29C 65/56* | (2006.01) | |
| *B29C 70/54* | (2006.01) | |
| *B29D 99/00* | (2010.01) | |
| *F16B 5/00* | (2006.01) | |
| B29C 70/16 | (2006.01) | |
| B29C 70/20 | (2006.01) | |
| B29C 70/22 | (2006.01) | |
| B29K 101/12 | (2006.01) | |
| B29K 105/08 | (2006.01) | |
| B29L 31/30 | (2006.01) | |
| B32B 3/24 | (2006.01) | |
| B32B 3/26 | (2006.01) | |
| B32B 3/28 | (2006.01) | |
| B32B 3/30 | (2006.01) | |
| B32B 5/02 | (2006.01) | |
| B32B 7/08 | (2019.01) | |
| B64C 1/12 | (2006.01) | |
| B64C 3/26 | (2006.01) | |

(52) U.S. Cl.
CPC ... *B32B 2260/046* (2013.01); *B32B 2262/106* (2013.01); *B32B 2305/07* (2013.01); *B32B 2305/10* (2013.01); *B32B 2305/18* (2013.01); *B32B 2398/20* (2013.01); *B32B 2605/18* (2013.01); *B64C 1/12* (2013.01); *B64C 3/26* (2013.01); *Y10T 428/24281* (2015.01); *Y10T 428/24289* (2015.01); *Y10T 428/24322* (2015.01); *Y10T 428/249923* (2015.04)

(56) References Cited

U.S. PATENT DOCUMENTS

| | | | | |
|---|---|---|---|---|
| 2006/0243860 A1* | 11/2006 | Kismarton | ......... | B29C 66/7212 244/132 |
| 2009/0020217 A1* | 1/2009 | Cano Cediel | ......... | B29C 70/342 156/219 |
| 2010/0186900 A1* | 7/2010 | Christ | ......... | B23K 20/129 228/2.1 |
| 2011/0031643 A1* | 2/2011 | Hache | ......... | B29C 70/545 425/290 |
| 2012/0219754 A1* | 8/2012 | Kampke | ......... | B29C 70/545 428/137 |
| 2013/0119191 A1* | 5/2013 | Wolfe | ......... | B29C 66/131 244/54 |
| 2016/0318631 A1* | 11/2016 | J?Rn | ......... | B29C 66/1122 |
| 2017/0197373 A1* | 7/2017 | Yanagisawa | ......... | B29C 70/224 |
| 2017/0341322 A1* | 11/2017 | Joachim | ......... | B32B 27/322 |
| 2018/0163769 A1* | 6/2018 | Vichniakov | ......... | F16B 25/0015 |
| 2018/0178459 A1* | 6/2018 | Parkes | ......... | B29C 66/742 |
| 2018/0290334 A1* | 10/2018 | Corsmeier | ......... | B28B 23/0006 |
| 2019/0061977 A1* | 2/2019 | Linde | ......... | B29C 66/0246 |
| 2020/0248732 A1* | 8/2020 | Vichniakov | ......... | B29C 66/21 |
| 2020/0398499 A1* | 12/2020 | Perrier | ......... | B29C 65/564 |

FOREIGN PATENT DOCUMENTS

| | | | | | |
|---|---|---|---|---|---|
| DE | 3715409 | A | * | 12/1987 | ......... B26F 1/02 |
| DE | 3715409 | A1 | * | 12/1987 | ......... B26F 1/02 |
| DE | 102009013265 | A1 | * | 9/2010 | ......... B21D 39/034 |
| DE | 102009056580 | A1 | * | 5/2011 | ......... B29C 65/562 |
| DE | 102010001634 | A1 | * | 8/2011 | ......... B26F 1/24 |
| DE | 102011054168 | A1 | * | 4/2013 | ......... B26F 1/40 |
| DE | 102013201963 | A1 | * | 8/2014 | ......... B29C 70/48 |
| DE | 102013005649 | A1 | * | 10/2014 | ......... B29C 70/48 |
| DE | 102013018530 | A1 | * | 5/2015 | ......... B29C 70/48 |
| DE | 102016001401 | A1 | * | 8/2016 | |
| DE | 102015210965 | A1 | * | 12/2016 | ......... B29C 65/601 |
| DE | 102015010905 | A1 | * | 2/2017 | |
| DE | 102016218896 | A1 | * | 3/2018 | |
| DE | 102017208309 | A1 | * | 11/2018 | ......... B29C 51/00 |
| EP | 64263 | A | * | 11/1982 | ......... B21D 22/02 |
| EP | 64263 | A2 | * | 11/1982 | ......... B21D 22/02 |
| FR | 2626629 | A | * | 8/1989 | ......... B29C 70/885 |
| FR | 2626629 | A1 | * | 8/1989 | ......... B29C 70/885 |
| FR | 2763881 | A1 | * | 12/1998 | ......... B26D 7/10 |
| FR | 2980733 | A1 | * | 4/2013 | ......... B29C 33/0033 |
| FR | 3033521 | A1 | * | 9/2016 | ......... B26D 7/10 |
| GB | 447520 | A | * | 5/1936 | |
| JP | 56161122 | A | * | 12/1981 | |
| JP | 60058223 | A | * | 4/1985 | |
| JP | 07237189 | A | * | 9/1995 | |
| JP | 2010253864 | A | * | 11/2010 | |
| JP | 2017132085 | A | * | 8/2017 | |
| KR | 1050683 | B1 | * | 7/2011 | |

OTHER PUBLICATIONS

Machine Translation of DE-102013201963-A1, Aug. 2014 (Year: 2014).*
Machine Translation of DE-102015210965-A1, Dec. 2016 (Year: 2016).*
Machine Translation of JP-2017132085-A, Aug. 2017 (Year: 2017).*
Machine Translation of DE-102015010905-A1, Feb. 2017 (Year: 2017).*
Dye, Metal Magic: Dimpling and Countersinking, May 21, 2021, Kitplanes Magazine (Year: 2021).*

* cited by examiner

COUNTERSINKS IN THIN GAUGE THERMOPLASTIC SKINS

BACKGROUND INFORMATION

1. Field

The present disclosure generally relates to composite structures, and deals more particularly with a method of countersinking thin gauge thermoplastic skins attached to an underlying structure by countersunk fasteners.

2. Background

In some applications, flush fasteners are configured to be countersunk into the surface of a structure to which they are attached. For example, in aircraft applications, outer skins can be attached to an airframe using fasteners having heads that are countersunk into the skin in order to avoid protrusions that interrupt the airstream over the skin.

In the case of the thin gauge, composite skins, the skin often needs to be thickened at the interface between the fastener and the skin in order to accept the countersunk fastener head. This added thickness increases the weight of the vehicle and well as material costs, but may not be needed for strength or stiffness purposes.

Accordingly, it would be desirable to provide a method and structure for countersinking fasteners in thin gauge composite skins which avoid the disadvantages mentioned above.

SUMMARY

The disclosure relates in general to composite structures, and more specifically to a method and structure for countersinking flush fasteners in thin gauge composite skins. The disclosed method involves secondarily forming a thermoplastic skin to accommodate countersink fasteners without a knife edge in bearing loading. The thermoplastic skin is dimpled in a hot forming process using a heated forming tool, taking advantage of ability of the thermoplastic skin to melt and be reformed. The hot formed dimples can be formed after holes are located and drilled in the thermoplastic skin, and/or before or after pilot holes drilled in the thermoplastic skin are enlarged to full size. Fastener holes in the support structure underlying the dimpled thermoplastic skin are countersunk to accommodate the dimples.

According to one aspect, a method is provided of making a countersink in a thermoplastic skin. The method comprises heating a forming tool to a melt temperature of the thermoplastic skin, and forming a countersink in the thermoplastic skin by driving the forming tool into the thermoplastic skin.

According to another aspect, a method is provided of making countersinks in a thermoplastic skin overlying a structure. The method comprises heat forming dimples in the thermoplastic skin, wherein the dimples are configured to extend into and conform to the countersunk holes.

According to still another aspect, a countersunk hole is provided passing through a thermoplastic skin and a structure underlying the thermoplastic skin. The countersunk hole comprises a fastener hole in the structure, the fastener hole having an inwardly extending fastener countersink beneath the thermoplastic skin, and a dimple formed in the thermoplastic skin, the dimple extending inwardly into and conforming to surfaces of the fastener countersink.

One of the advantages of the disclosed embodiments is that countersunk holes can be formed in a composite skin without the need for increasing the thickness of the skin in the area of the countersunk hole. Another advantage is countersunk holes may be formed in composite skins using relatively simple tooling. Another advantage of the disclosed embodiments is that vehicle weight and material costs can be reduced.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

DETAILED DESCRIPTION

Figure 1:
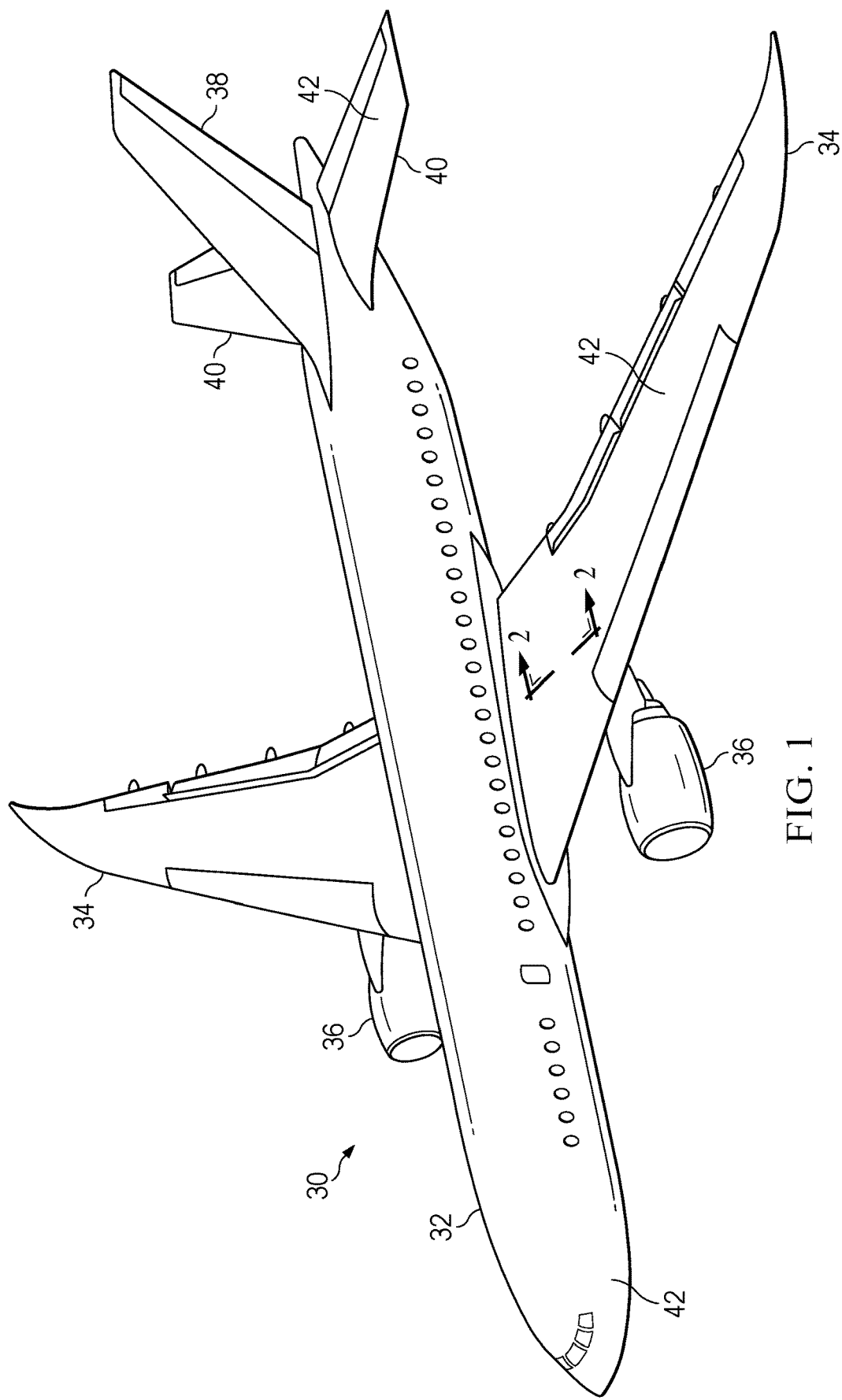
FIG. 1 is an illustration of a perspective view of an airplane having an outer skin joined to an underlying airframe by countersunk, flush fasteners.

Referring first to FIG. 1, an airplane 30 comprises a fuselage 32, wings 34, engines 36 and an empennage formed by a vertical stabilizer 38 horizontal stabilizers 40. The airplane 30 also has a skin 42 covering and attached to an underlying structure forming an airframe (not shown in FIG. 1). In this example, the skin 42 is a thin multi-ply composite, in which each ply is comprised of reinforcing fibers held in a thermoplastic matrix. In the case of an airplane, the skin 42 has a thickness T (FIG. 3) typically in the range of 1-3 mm, however the thickness may vary depending upon the skin location. The skin may be any of various types of thermoplastics such as PEKK (polyetherketoneketone), PEEK (polyetheretherketone), PSU (polysulfone), PEI (polyethylenimine), PE (polyethylene) and PP (polypropylene), to name only a few. The reinforcing fibers may be any of various types such as continuous carbon fiber. As will be discussed below in more detail, the disclosed embodiments relate to a method of fastening the thermoplastic skin 42 to the underlying airframe structure using flush fasteners that are countersunk into both the thermoplastic skin 42 and the underlying structure.

Figure 2:
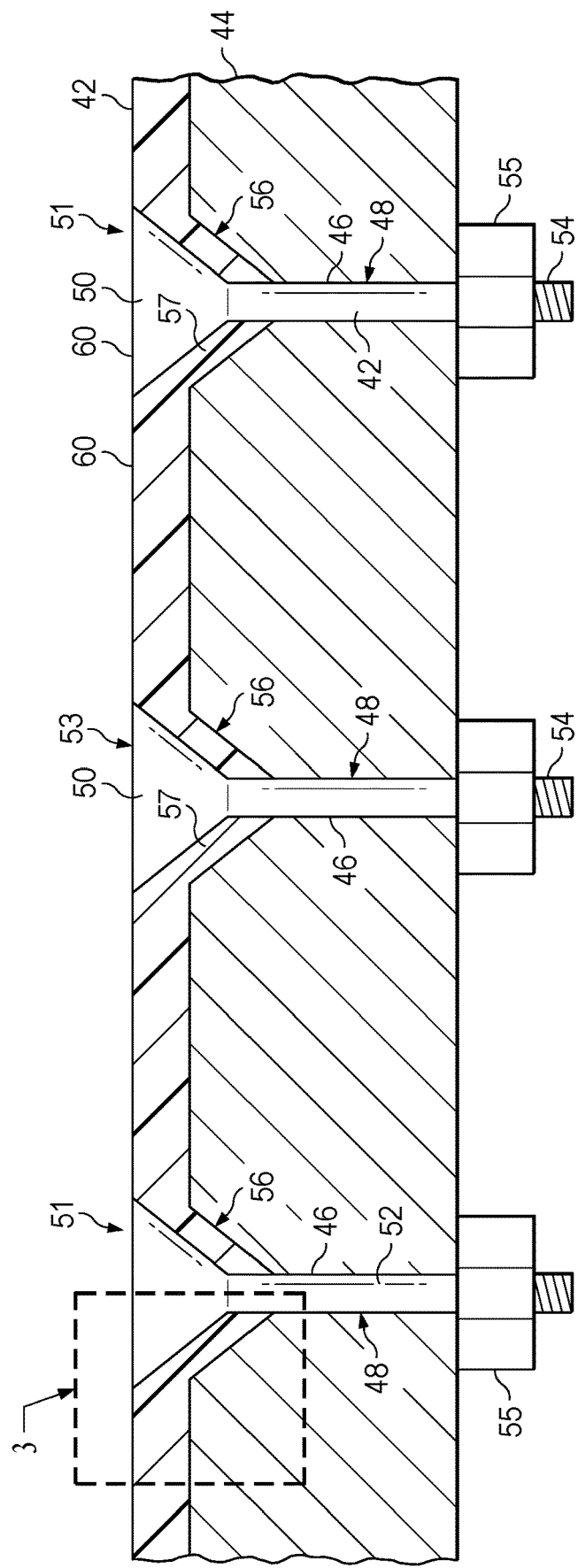
FIG. 2 is an illustration of a fragmentary, sectional view taken along the line 2-2 in FIG. 1.
Figure 3:
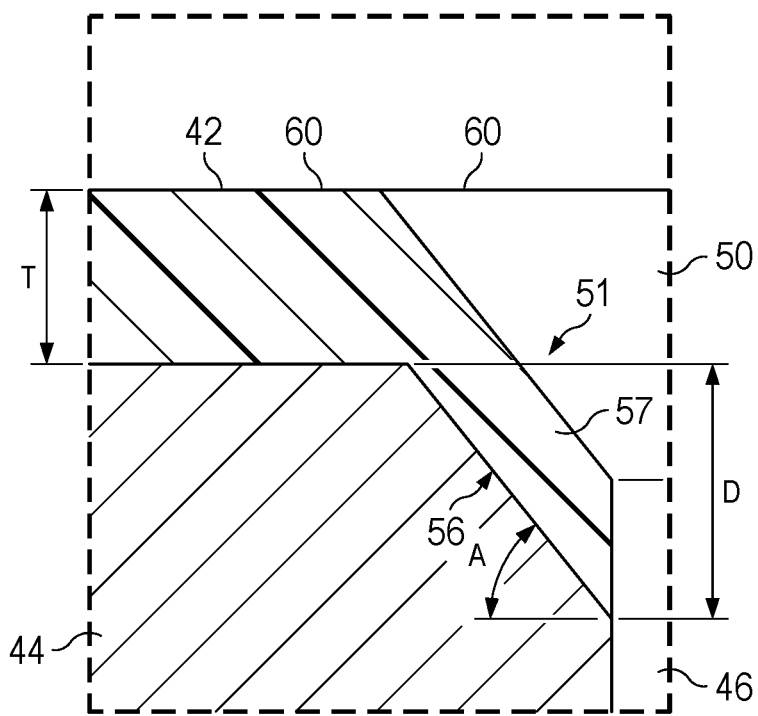
FIG. 3 is an illustration of the area designated as "FIG. 3" in FIG. 2.
Figure 4:
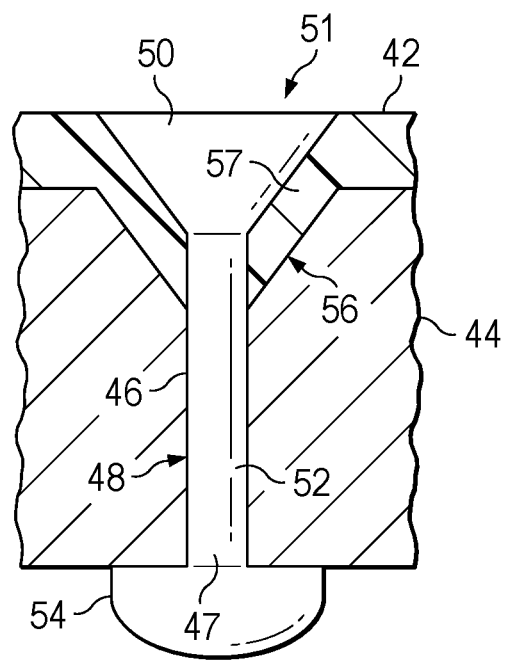
FIG. 4 is an illustration of a cross-sectional view of a countersunk rivet attaching the skin to the airframe of the airplane shown in FIG. 1.

Attention is now directed to FIGS. 2 and 3 which illustrate a section of the thermoplastic skin 42 that is attached by fasteners 46 to a structure 44 (sometimes also referred to as an "underlying structure") beneath it, such as a wing spar or stringer. Each of the fasteners 46 comprises a body 52 passing through a fastener hole 48 in the structure 44, a threaded tail 54 and a tapered head 50 having an upper surface 53 that is flush 60 with the surface of thermoplastic skin 42. The tapered heads 50 are recessed in countersinks 51, each of which comprises a fastener countersink 56 extending inwardly in the structure 44 and a dimple 57 in the thermoplastic skin 42 which extends outwardly and is received within the fastener countersink 56. The dimples 57 are aligned with the fastener holes 48 and have a cone shape that matches and complements the cone shape of the fastener countersinks 56. The outwardly extending dimples 57 therefore nest within and conform to the shape of the fastener countersinks 56, thereby eliminating any gaps between the fastener 46 between the thermoplastic skin 42 and the structure 44. The conformal nesting arrangement described above also avoids knife edge loading of the fastener 46 and improves the load transition from the thermoplastic skin 42 through the fastener 46 to the structure 44. Referring to FIG. 3, the fastener countersinks 56 have a depth D and taper at an angle A that matches that of the tapered head 50. In this example, nuts 55 are threaded onto the tails 54 of the fasteners 46, however a variety of other types of fasteners may be used, such as rivets 47 shown in FIG. 4.

Figure 5:
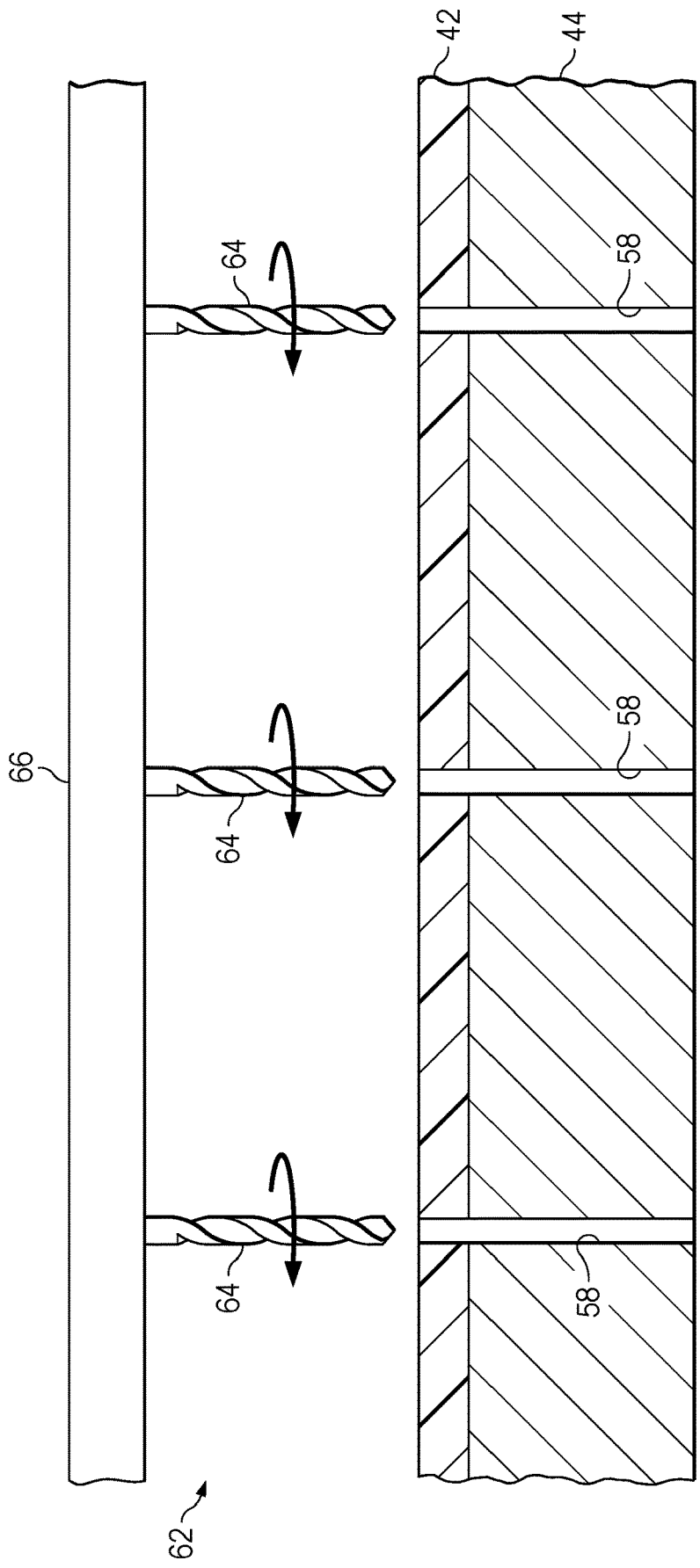
FIG. 5 is an illustration of a fragmentary, cross sectional view showing one method of forming pilot holes in a thin gauge, thermoplastic skin, and an underlying structure, simultaneously.
Figure 6A:
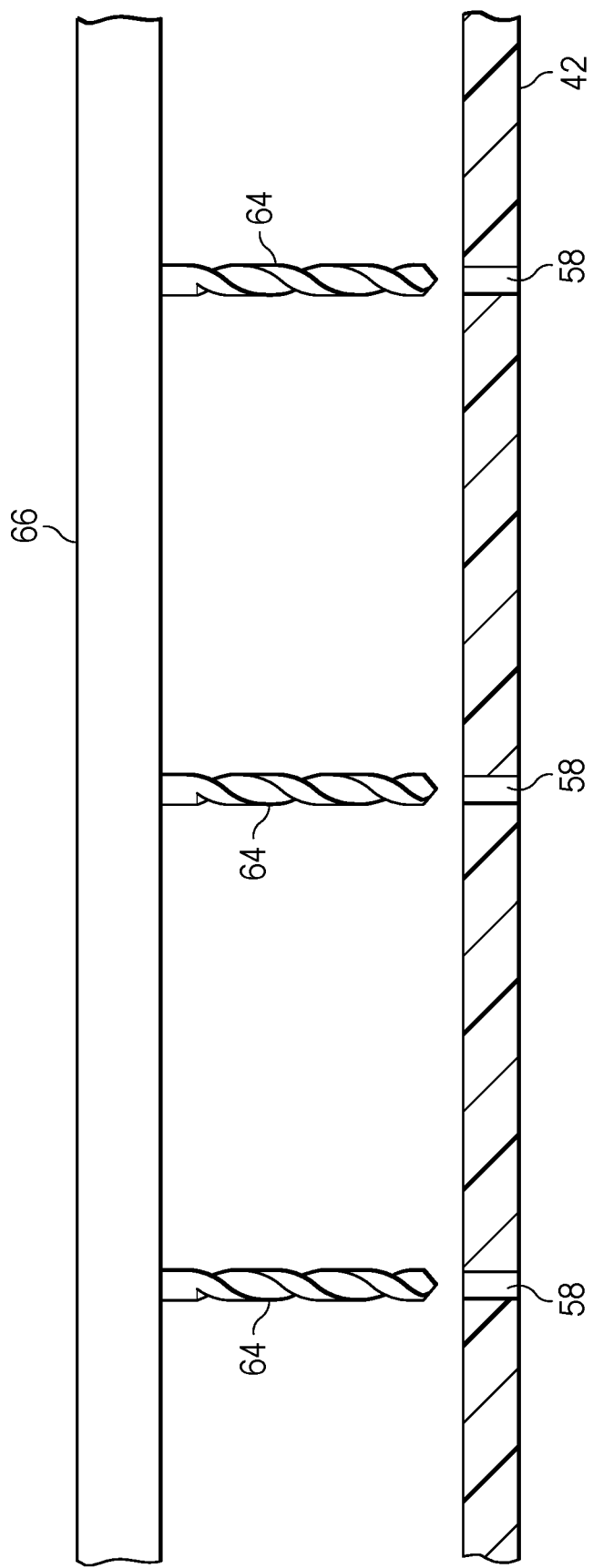
FIGS. 6A and 6B are illustrations of fragmentary, cross sectional views showing another method of forming the pilot holes.
Figure 6B:
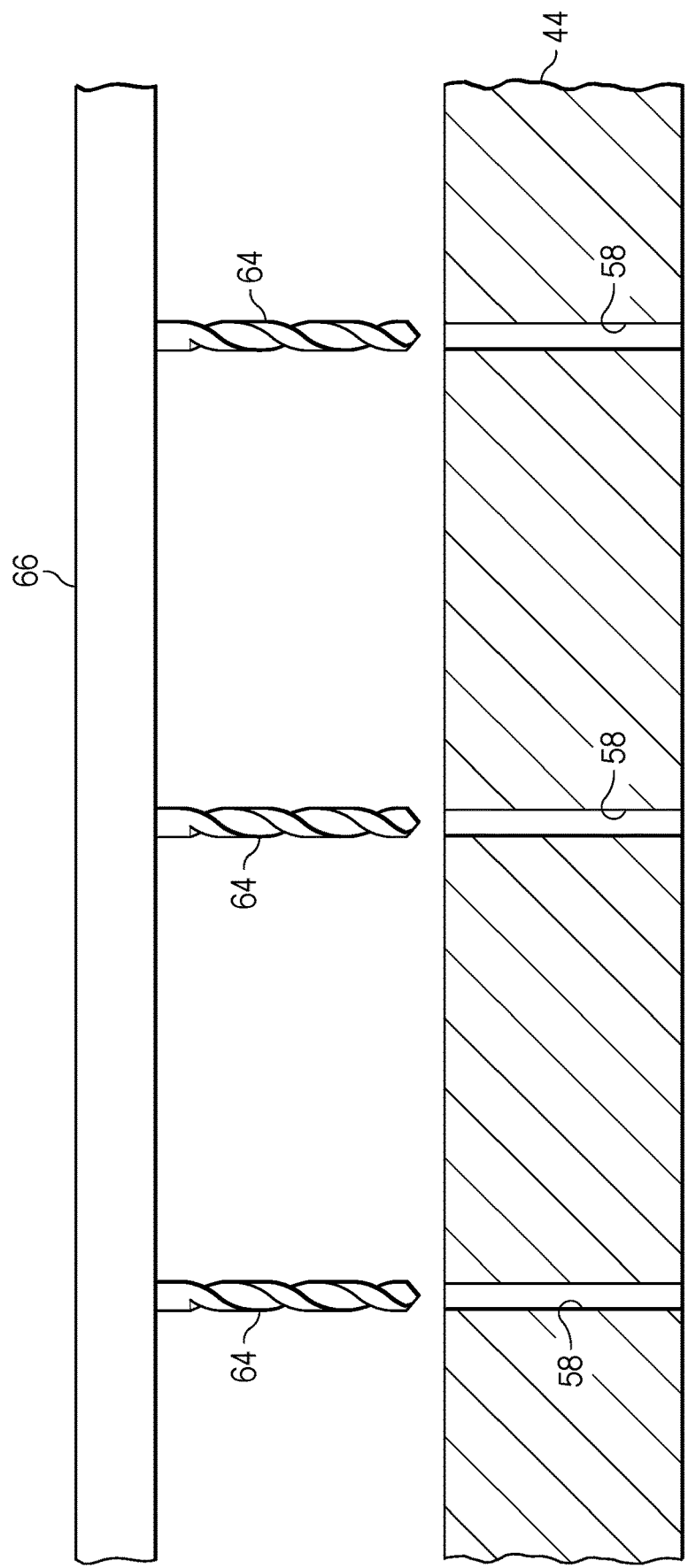

The countersinks 51 can be formed by any of several methods. For example, referring to FIGS. 5, 6A and 6B, according to one method, the thermoplastic skin 42 is placed over the structure 44 and pilot holes 58 are drilled through the thermoplastic skin 42 and structure 44 simultaneously using drill bits 64 that are mounted on a common structure such as a jig 66. This technique assures that the pilot holes 58 in the thermoplastic skin 42 and those in the structure 44 are precisely aligned with each other. In another technique, shown in FIGS. 6A and 6B, the pilot holes 58 in the drilled in the thermoplastic skin 42 and the structure 44 in separate operations. However this technique requires that the thermoplastic skin 42 and structure 44 be placed in a fixture (not shown) to ensure that the two sets of pilot holes 58 are precisely registered with each other when the thermoplastic skin 42 is placed over the structure 44.

Figure 7:
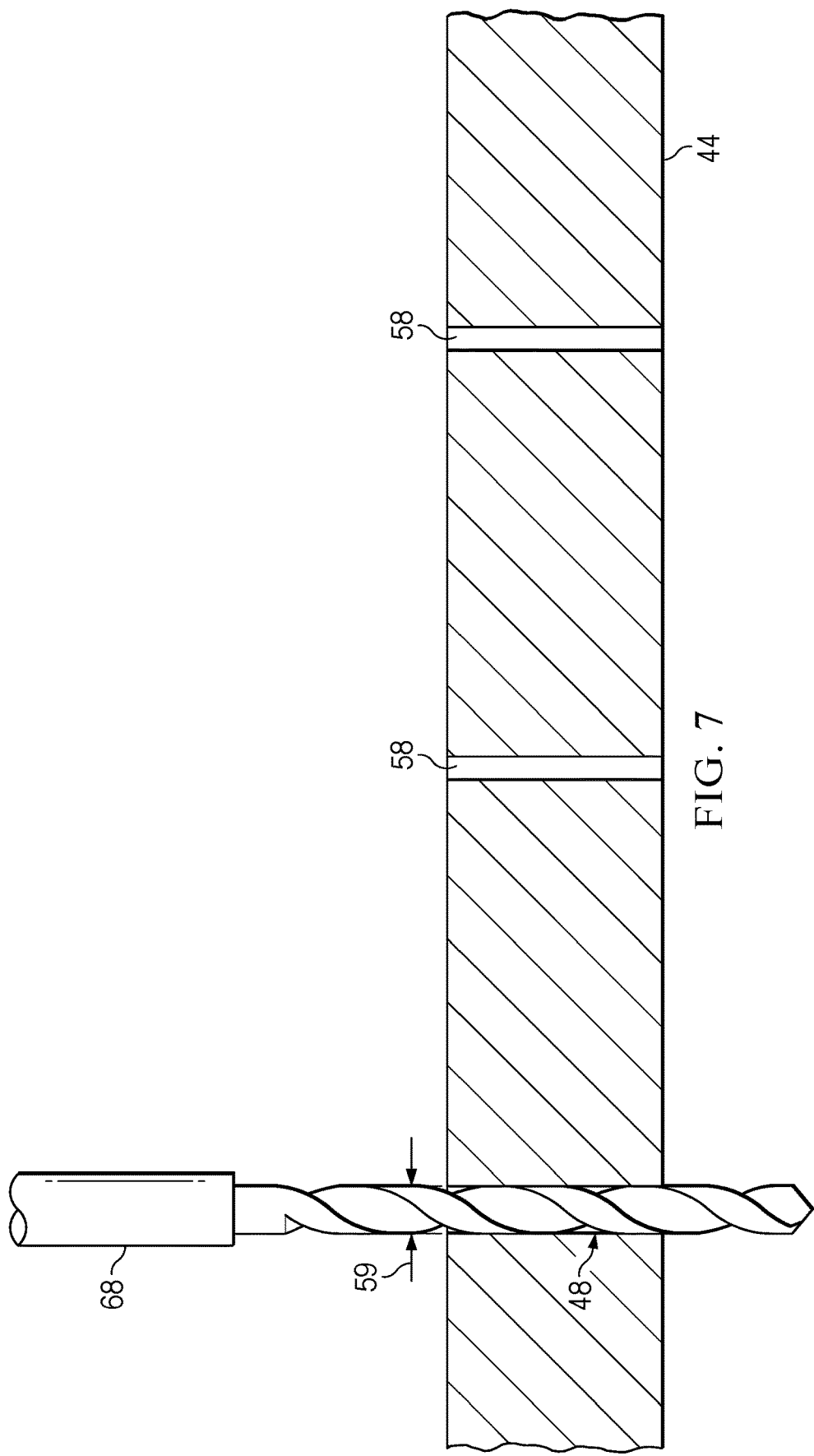
FIG. 7 is an illustration of a fragmentary, cross sectional view showing how the pilot holes in the underlying structure are enlarged to final size.

Referring to FIG. 7, after the pilot holes 58 are drilled in the structure 44, the pilot holes 58 are enlarged to the desired final diameter 59 of the fastener holes 48 using drills 68 having a diameter matching that of the fastener holes 48. The fastener holes 48 may be drilled to their final diameters 59 either one at a time, or in one or more groups using gangs of the drills 68 that are mounted in fixed relationship to each other on a jig, similar the gang drill assemble 62 shown in FIG. 5.

Figure 8:
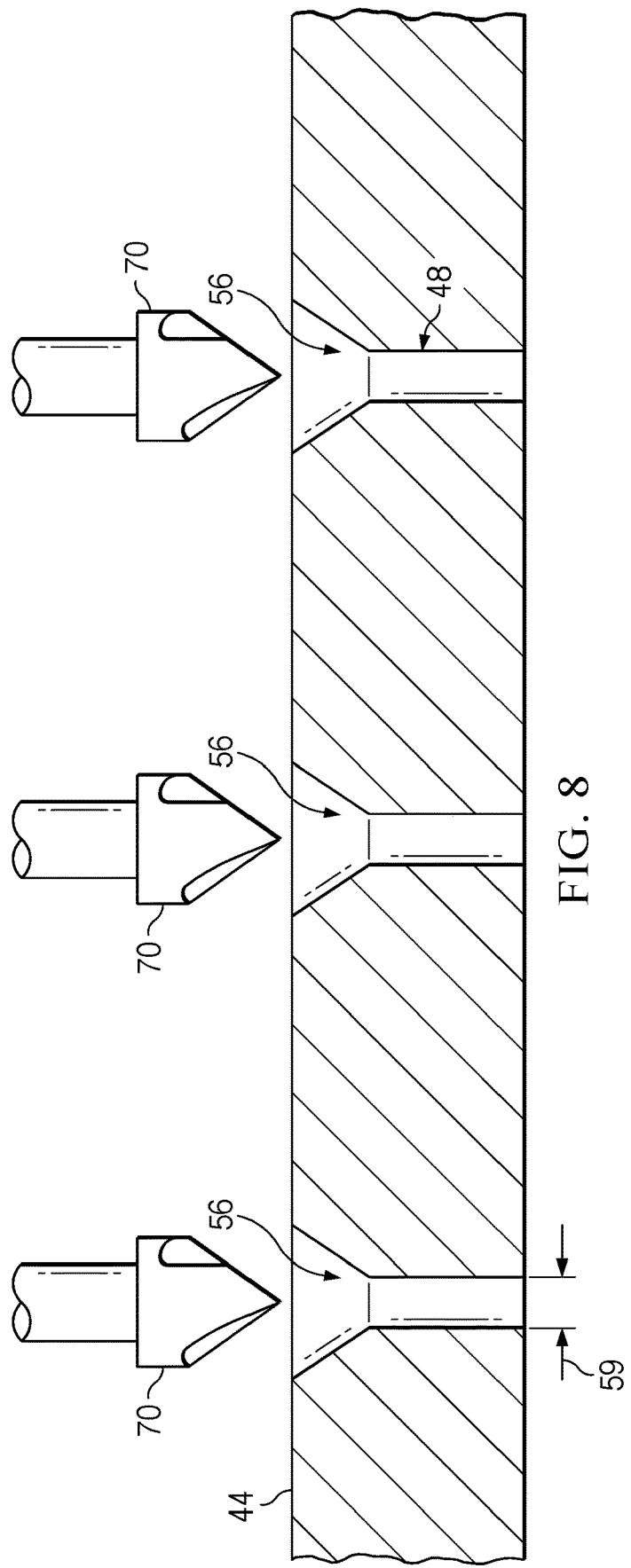
FIG. 8 is an illustration of a fragmentary, cross sectional view showing how countersinks are formed in the fastener holes in the structure.
Figure 9:
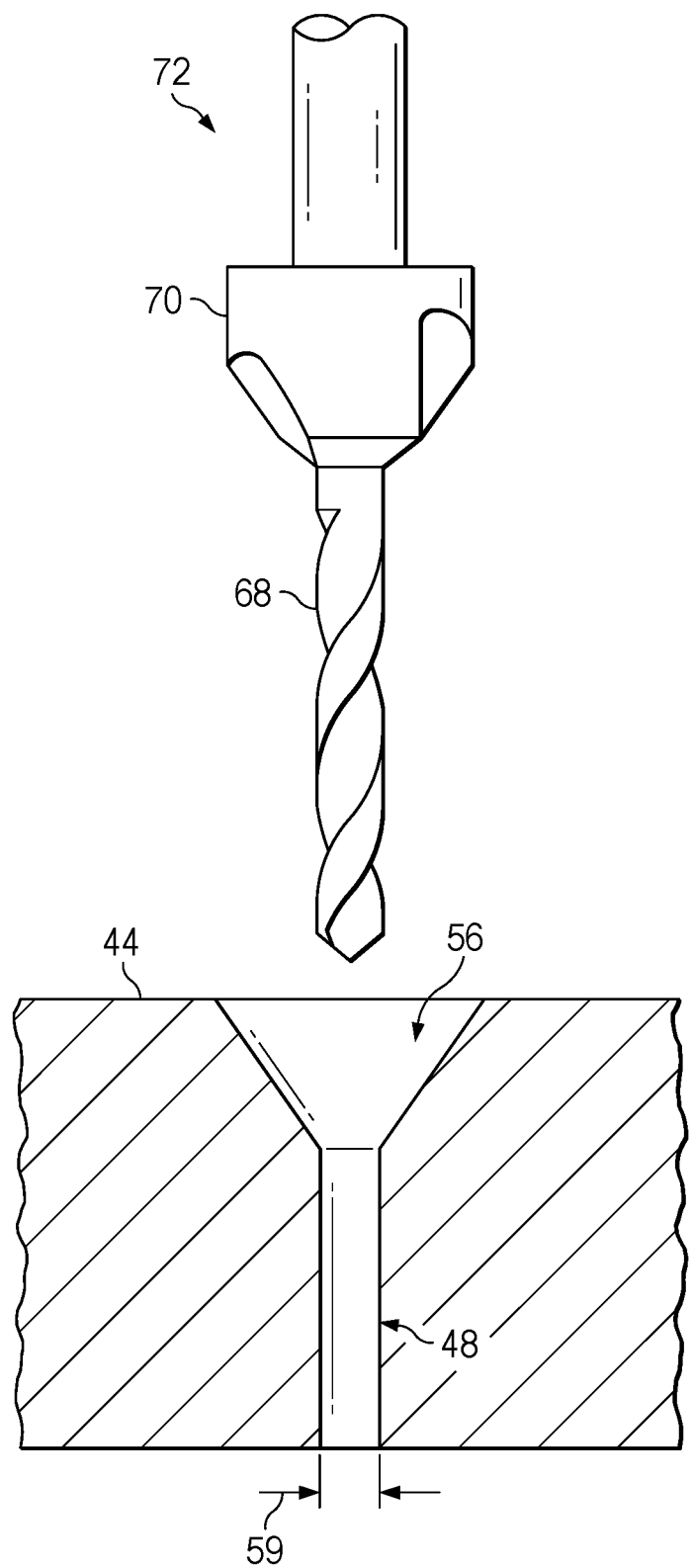
FIG. 9 is an illustration of a fragmentary, cross sectional view of the structure showing how the fastener holes and countersinks can be drilled in one operation.

Referring to FIG. 8, following the drilling operation shown in FIG. 7, fastener countersinks 56 are formed in the top ends of the fastener holes 48 using countersink bits 70 or similar rotating tools. The fastener holes 48 can be countersunk one at a time, or in groups using gangs of the countersink bits 70 mounted on a jig (not shown) which align the countersink bits 70 relative to each other, in registration with the fastener holes 48. It is also possible to form the fastener countersinks 56 at the same time that the fastener holes 48 are drilled using a countersink drill 72 shown in FIG. 9. The countersink drill 72 comprises a countersink bit 70 combined with a drill 68.

Figure 10:
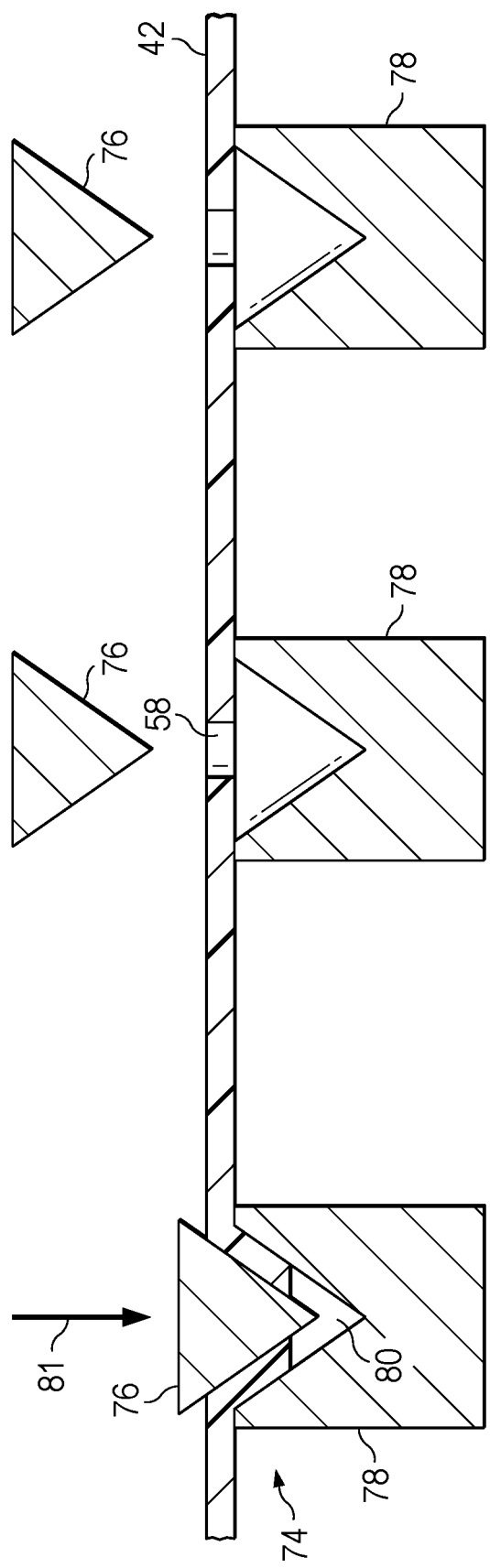
FIG. 10 is an illustration of a diagrammatic view showing how dimples may be punch formed in a thin gauge thermoplastic skin using tool sets.
Figure 11:
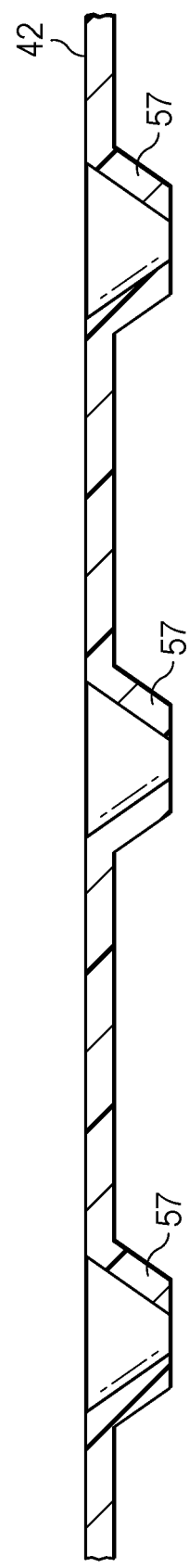
FIG. 11 is an illustration of a cross-sectional view of the thermoplastic skin having dimples formed using the tool set shown in FIG. 10.

Attention is now directed to FIGS. 10 and 11 which illustrate one method of forming dimples 57 in the thermoplastic skin 42 using a matched set of dies 74. The matched set of dies 74 comprises lower dies or mandrels, 78 and an upper die sometimes referred to herein as a forming tool 76 which may be a punch. Each of the forming tools 76 is heated using any suitable means to a temperature that is sufficient to locally melt the thermoplastic skin 42 in the areas where the dimples 57 of the thermoplastic skin 42 are to be formed. In other examples, it may be possible to heat the thermoplastic skin 42 in the areas where the dimples 57 are to be formed using a heat gun or other suitable device. Although not shown in the drawings, the forming tools 76 may be mounted on a suitable mechanism that displaces 81 them downwardly into the die cavities 80, causing dimples 57 to be hot formed in the thermoplastic skin 42 which take the shape of the cavities 80 in the lower dies 78. The shapes of the forming tools 76 and the die cavities 80 are configured to form the dimples 57 (FIG. 11) to match the shape of the fastener countersinks 56 underlying the dimples 57, allowing the dimples 57 to nest within and conform to the geometry of the fastener countersinks 56.

Figure 12:
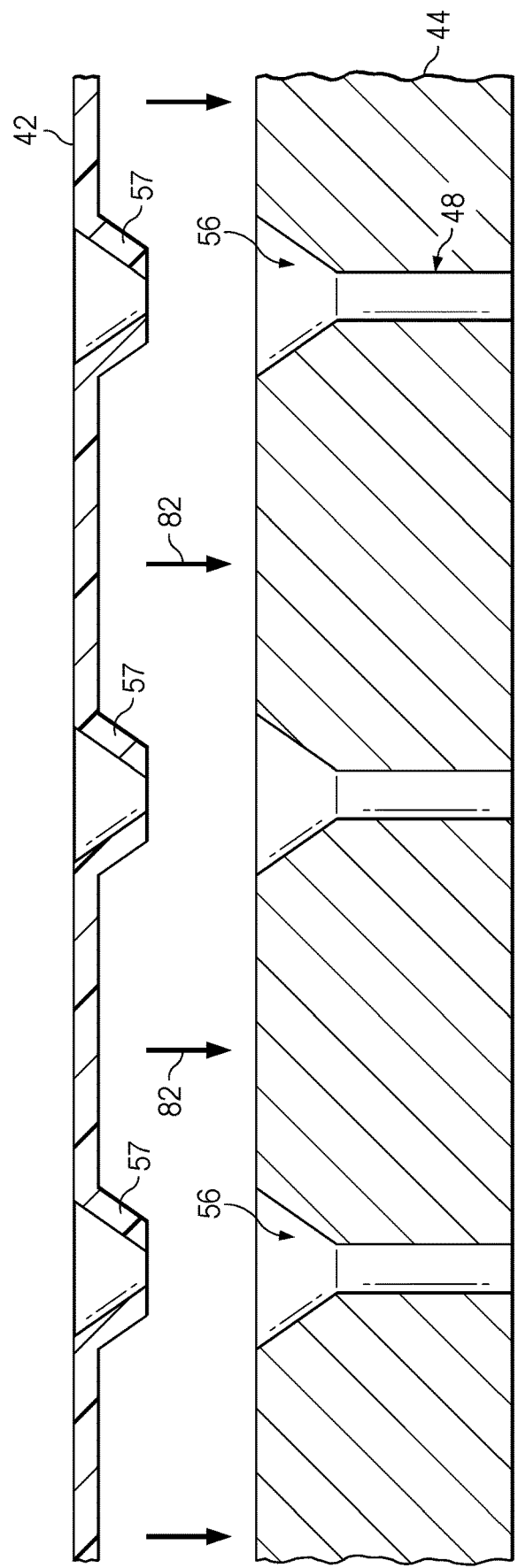
FIG. 12 is an illustration of a fragmentary, cross sectional view showing the thermoplastic skin with formed dimples about to be placed onto an underlying structure.
Figure 13:
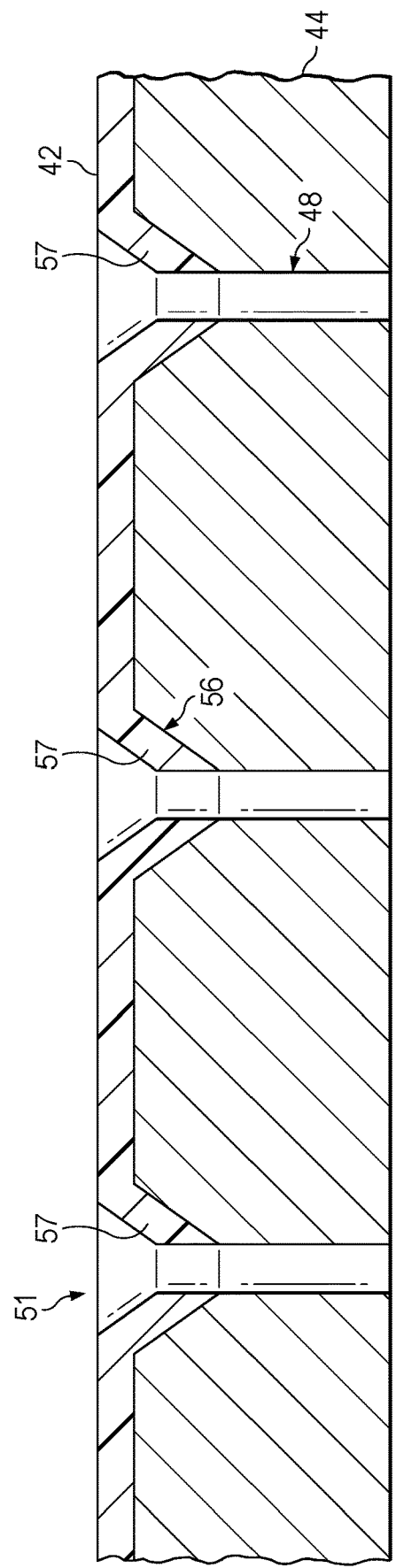
FIG. 13 is an illustration similar to FIG. 12 but showing the thermoplastic skin having been placed on the underlying structure.

Referring now to FIGS. 12 and 13, the next step of the method comprises placing the thermoplastic skin 42 having the dimples 57 formed as described above in connection with FIGS. 10 and 11, down onto the structure 44. The dimples 57 having been formed in alignment with the fastener holes 48, the dimples 57 are received within and conform to the shape of the fastener countersinks 56, which effectively covers and lines the surfaces of the fastener countersink 56. Following the placement of the thermoplastic skin 42 on the structure 44, the fasteners 46 (FIG. 2) are be installed.

Figure 14:
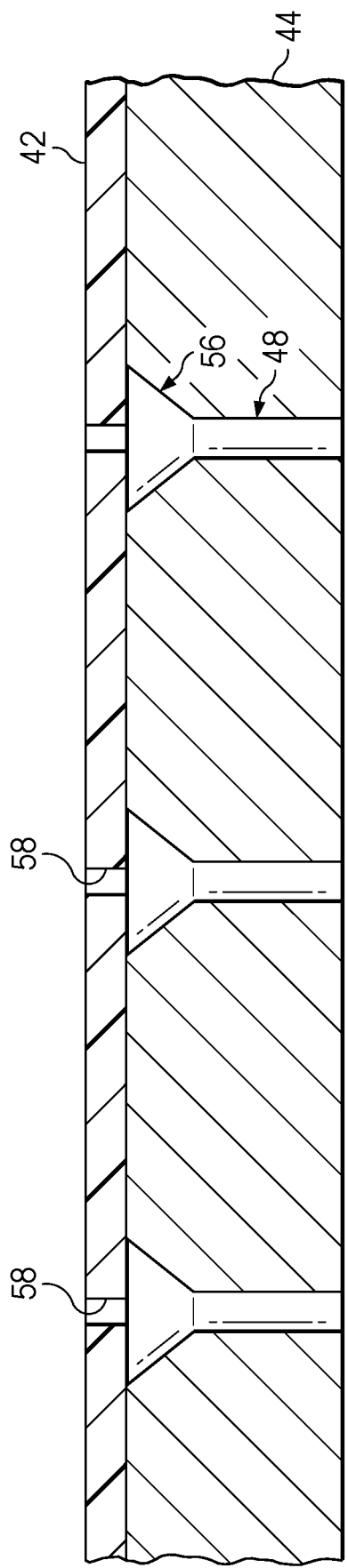
FIG. 14 is an illustration showing a fragmentary cross-sectional view of a thermoplastic skin with pilot holes, placed on top of an underlying structure having countersunk fastener holes.
Figure 15:
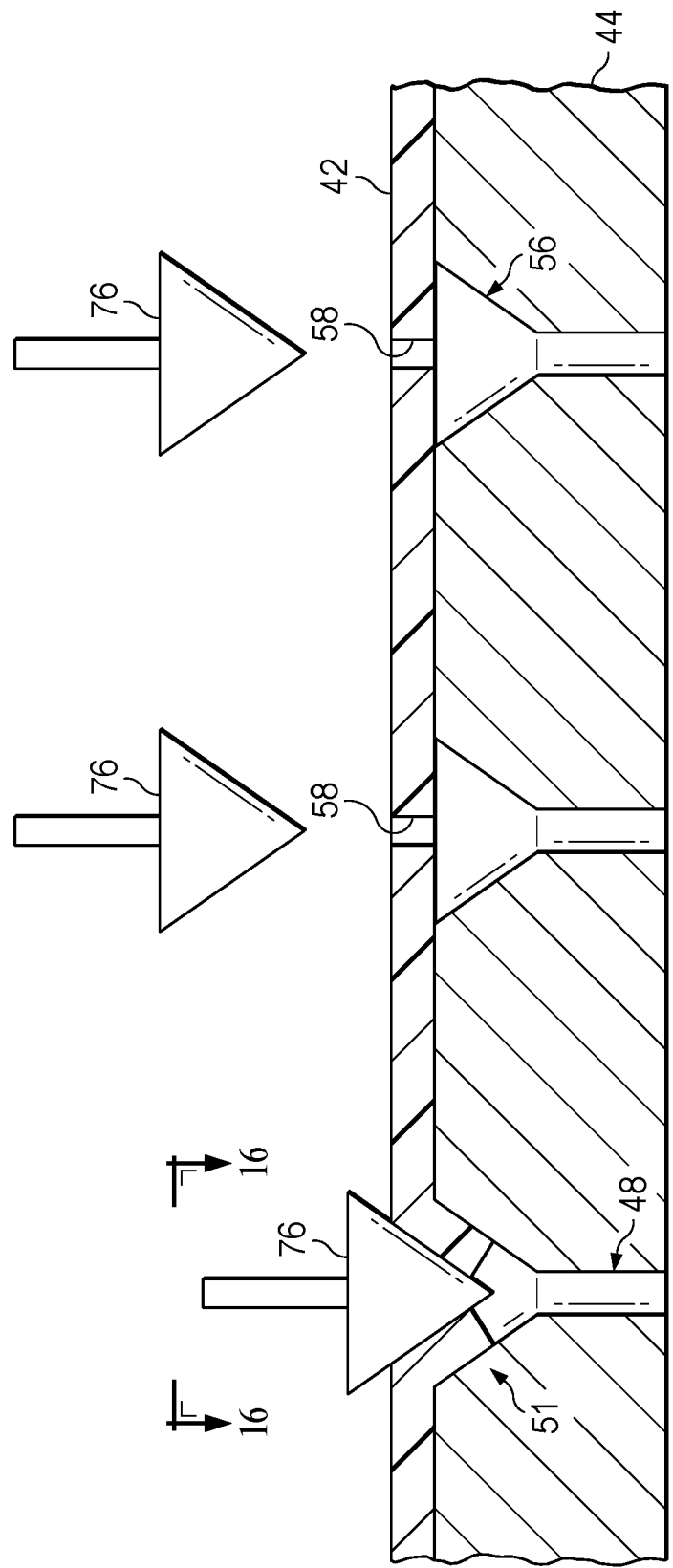
FIG. 15 is a view similar to FIG. 14, but showing one method of forming dimples in the thermoplastic skin down into the countersunk fastener holes.
Figure 16:
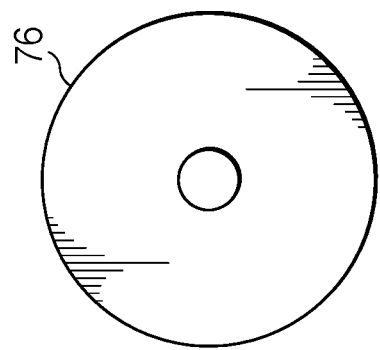
FIG. 16 is an illustration of a plan view in the direction of the arrows designated as "FIG. 16" in FIG. 15.

In the method described above, the dimples 57 are heat formed in the thermoplastic skin 42 before the thermoplastic skin 42 is placed on the structure 44. An alternate method of making the dimples 57 is shown in FIGS. 14-16. As shown in FIG. 14, the thermoplastic skin 42 having pilot holes 58 drilled therein is placed on top of the structure 44 in which the fastener holes 48 and fastener countersinks 56 have been previously formed. Next, as shown in FIG. 15, heated forming tools 76 are displaced downwardly through the pilot holes 58, melting and forming the thermoplastic skin 42 into the fastener countersinks 56. In this example, the fastener countersinks 56 effectively act as die cavities which, along with the shape of the forming tools 76 form the dimples 57 to the shape of the fastener countersinks 56.

Figure 17:
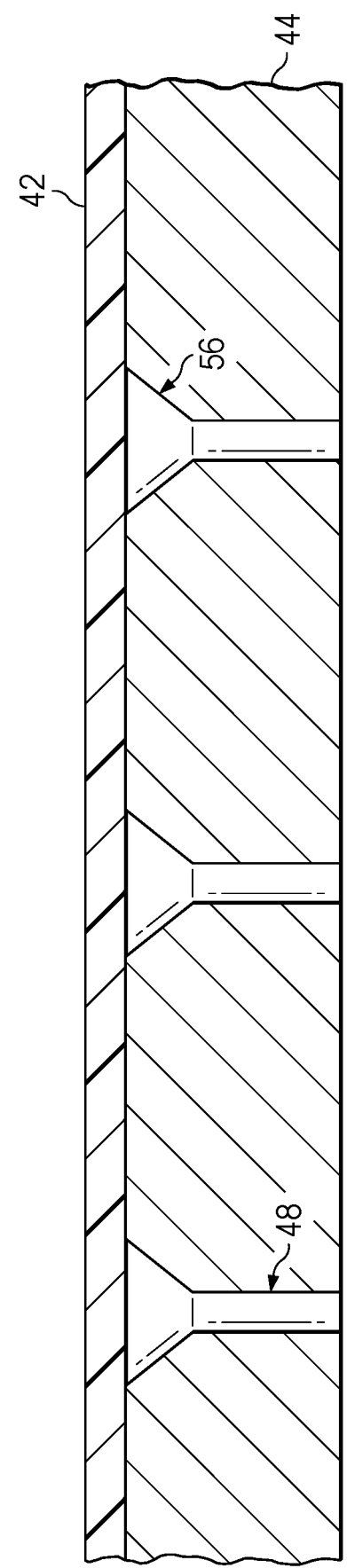
FIG. 17 is an illustration of a fragmentary, cross sectional view showing a thermoplastic skin placed on top of an underlying structure having countersunk fastener holes.
Figure 18:
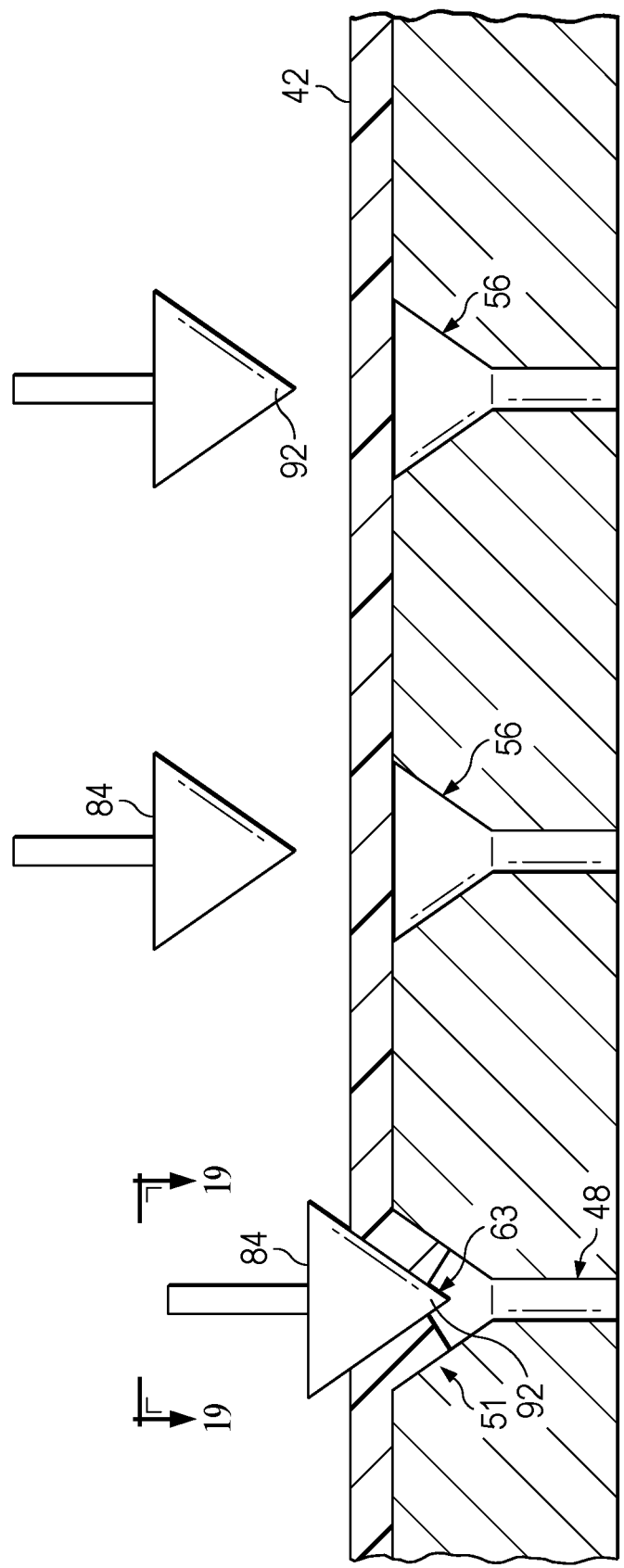
FIG. 18 is an illustration similar to FIG. 17 but showing an alternate method of forming dimples in the thermoplastic skin down into the countersunk fastener holes.
Figure 19:
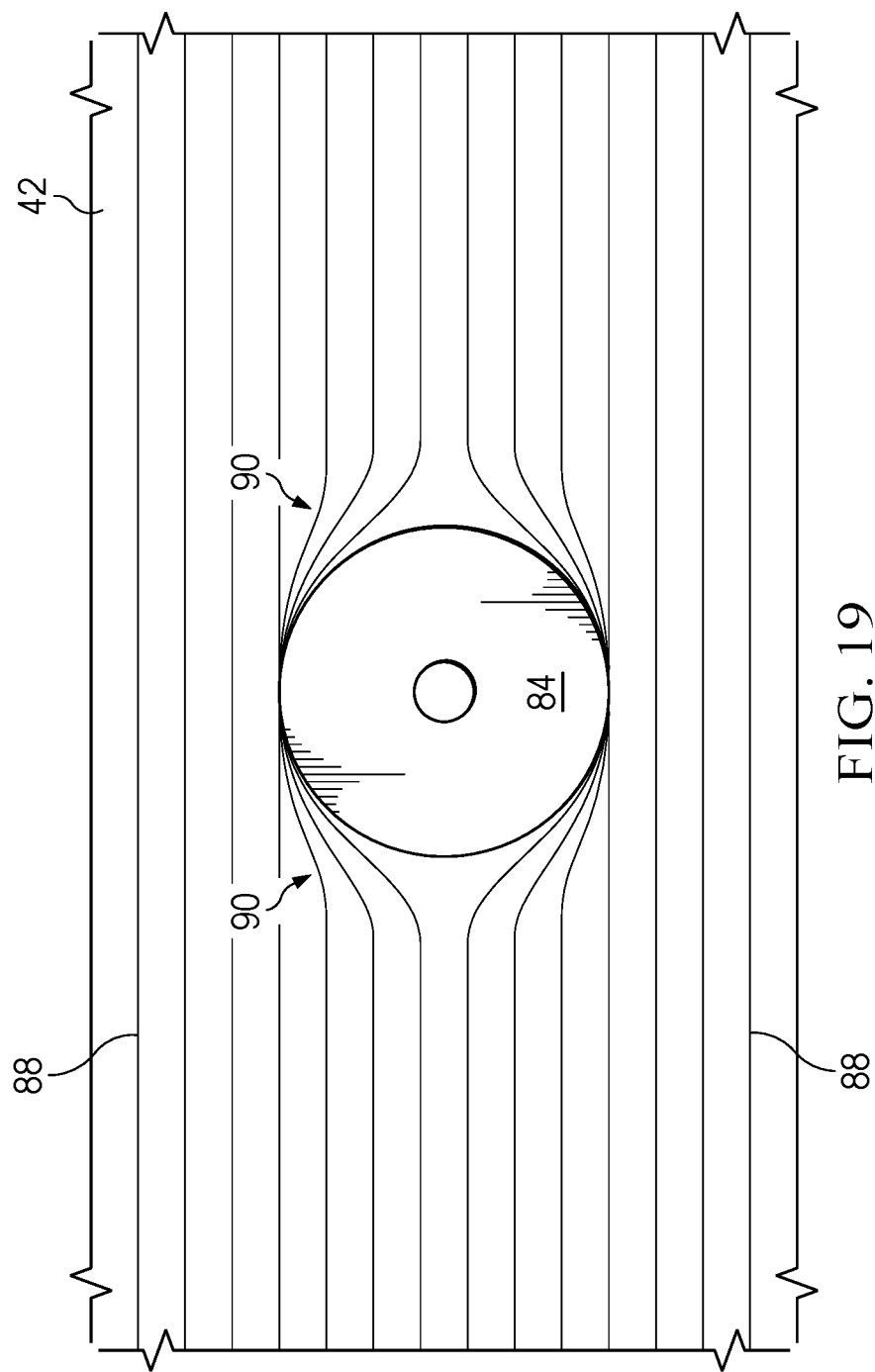
FIG. 19 is an illustration taken in the direction of the area shown designated as "FIG. 19" in FIG. 18 showing how a heated spike is useful in separating reinforcing fibers in the thermoplastic skin as the dimples are being formed.

Attention is now directed to FIGS. 17-19 which illustrate another method of forming the countersinks 51. In this example, the thermoplastic skin 42, devoid of pilot holes, is placed on top of the structure 44 overlying the fastener countersinks 56 (FIG. 17). Then, as shown in FIGS. 18, heated spikes 84 are driven or plunged into the thermoplastic skin 42, penetrating the thermoplastic skin 42 and forcing portions of the thermoplastic skin 42 down into the fastener countersinks 56, thereby forming dimples 57 against the surfaces of the fastener countersinks 56. In this example, pointed outer tips 92 of the heated spikes 84 penetrate through the bottom 87 of the thermoplastic skin 42 to create an opening 63 in each of the dimples 57 that is aligned with one of the fastener holes 48. Consequently, driving the heated spikes 84 into the thermoplastic skin 42 in this manner both forms the shape of the dimples 57 while at the same time creating openings 63 in the dimples 57 that accommodate the fasteners 46. Using this technique may eliminate the need for drilling holes in the thermoplastic skin 42, such as the holes 58 shown in FIG. 14. In other examples where the pointed outer tips 92 do not penetrate the bottom 87 of the thermoplastic skin 42, the openings 63 can be created by drilling through the dimples 57.

The heated spikes 84 are heated by any suitable means to the melt temperature of the thermoplastic skin 42. The shape of the heated spikes 84 is configured to match that of the fastener countersinks 56 and have a pointed outer tip 92 that is sharp enough to pierce the thermoplastic skin 42 as it is driven down through the thermoplastic skin 42. As previously mentioned, the thermoplastic skin 42 includes a continuous fiber reinforcement held in a thermoplastic matrix. The fibers may be unidirectional, woven or knitted. In the illustrated example, the reinforcing fibers 88 are unidirectional but may have varying fiber directions depending on the ply schedule that is used to layup the thermoplastic skin 42. The use of a relatively sharp, heated spike 84 to form the dimples 57 into the fastener countersinks 56 aides in forcing and deforming 90 the fibers to spread (see FIG. 19) rather than being cut, as the heated spike 84 is driven into the thermoplastic skin 42.

Figures 20, 21:
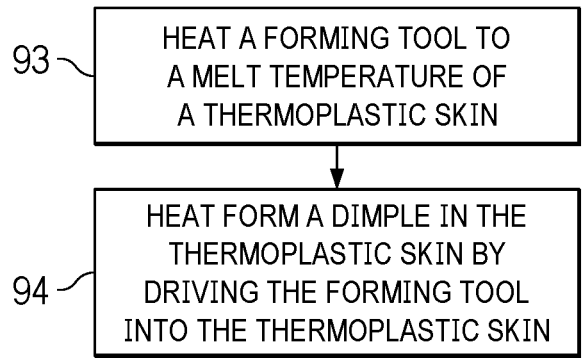
FIG. 20 is an illustration of a flow diagram of a method of making a dimple in a thermoplastic skin.
FIG. 21 is an illustration of a flow diagram of a method of making countersinks in a composite skin overlying a structure having countersunk holes.

FIG. 20 broadly illustrates the steps of a method of making a countersink in a thermoplastic skin 42. At 93 a forming tool 76 is heated to a melt temperature of a thermoplastic skin 42. After heating the forming tool 76, at 94, a dimple 57 is formed in thermoplastic skin 42 by driving the forming tool 76 into the thermoplastic skin 42.

FIG. 21 broadly illustrates the steps of a method of making dimples in a composite skin overlying a structure having countersunk holes. At 100, the dimples 57 are heat formed in the thermoplastic skin 42 and are configured to extend into and conform to the shape of the countersunk holes in the structure 44.

Figure 22:
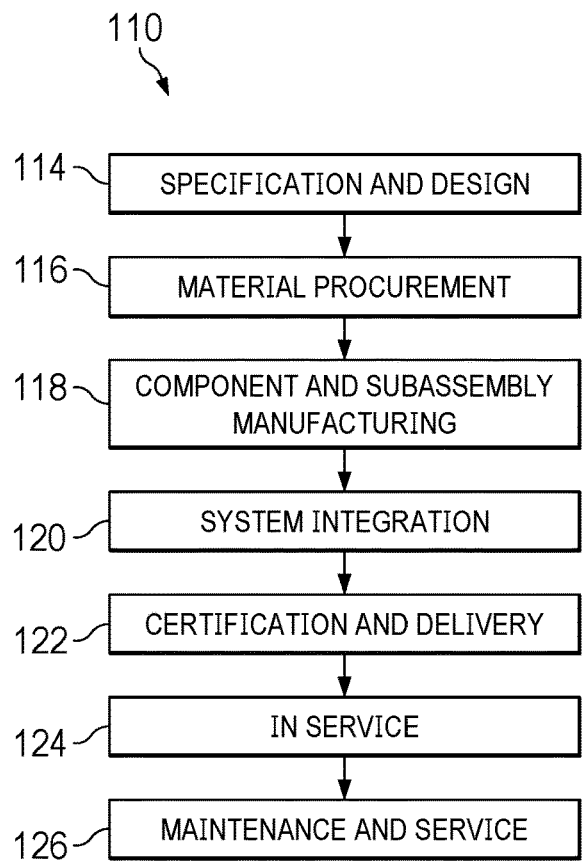
FIG. 22 is an illustration of a flow diagram of aircraft production and service methodology.
Figure 23:
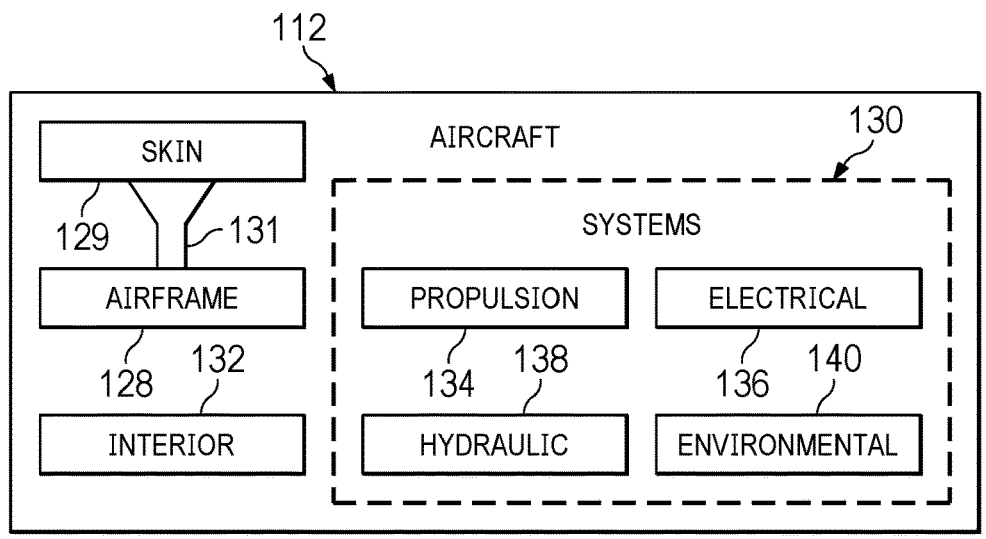
FIG. 23 is an illustration of a block diagram of an aircraft.

Examples of the disclosure may find use in a variety of potential applications, particularly in the transportation industry, including for example, aerospace, marine, automotive applications and other application where thermoplastic skins are attached to a structure by countersunk fasteners. Thus, referring now to FIGS. 21 and 22, examples of the disclosure may be used in the context of an aircraft manufacturing and service method 110 as shown in FIG. 21 and an aircraft 112 as shown in FIG. 22. Aircraft applications of the disclosed examples may include a variety of assemblies such as skins that are attached to an underlying structure by flush fasteners. During pre-production, the method 110 may include specification and design 114 of the aircraft 112 and material procurement 116. During production, component and subassembly manufacturing 118 and system integration 120 of the aircraft 112 takes place. Thereafter, the aircraft 112 may go through certification and delivery 122 in order to be placed in service 124. While in service by a customer, the aircraft 112 is scheduled for routine maintenance and service 126, which may also include modification, reconfiguration, refurbishment, and so on.

Each of the processes of method 110 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 22, the aircraft 112 produced by method 110 may include an airframe 128 with a plurality of high-level systems 130 and an interior 132. The aircraft 112 may include a skin 129 attached to various parts of the airframe 128 by countersunk, flush fasteners 131. Examples of high-level systems 130 include one or more of a propulsion system 134, an electrical system 136, a hydraulic system 138 and an environmental system 140. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 110. For example, components or subassemblies corresponding to component and subassembly manufacturing 118 may be fabricated or manufactured in a manner similar to components or subassemblies produced while the aircraft 112 is in service. Also, one or more apparatus examples, method examples, or a combination thereof may be utilized during the component and subassembly manufacturing 118 and system integration 120, for example, by substantially expediting assembly of or reducing the cost of an aircraft 112. Similarly, one or more of apparatus examples, method examples, or a combination thereof may be utilized while the aircraft 112 is in service, for example and without limitation, to maintenance and service 126.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of making a dimple in a thermoplastic skin for attachment to a structure, the method comprising:
    heating a cone-shaped forming tool to a melt temperature of the thermoplastic skin; and
    placing the thermoplastic skin on the structure;
    heat forming the dimple in the thermoplastic skin to match a depth and a taper angle of a cone shape of a previously formed fastener countersink of the structure by driving the heated cone-shaped forming tool into the thermoplastic skin;
    wherein driving the heated cone-shaped forming tool into the thermoplastic skin includes forming the thermoplastic skin into the previously formed fastener countersink of the structure after placing the thermoplastic skin on the structure, wherein the dimple extends into and conforms to a shape of the fastener countersink.

2. The method of claim 1, the thermoplastic skin is a fiber reinforced thermoplastic skin.

3. The method of claim 1, further comprising forming an opening in the dimple, the opening aligned with a previously formed fastener hole of the fastener countersink and configured to receive a fastener therethrough.

4. The method of claim 3, wherein the forming the opening in the dimple is performed using the heated cone-shaped forming tool.

5. The method of claim 4, wherein the heated cone-shaped forming tool is a heated spike, and
    driving the forming tool further includes penetrating the thermoplastic skin with the heated spike.

6. The method of claim 4, further comprising:
    drilling a hole through the thermoplastic skin, and
    driving the heated cone-shaped forming tool further includes driving the heated cone-shaped forming tool into the hole.

7. The method of claim 3, further comprising:
    inserting a fastener through the opening in the dimple and the fastener hole to attach the thermoplastic skin to the structure.

8. A method of making a dimple in a fiber reinforced thermoplastic skin for attachment to a structure having previously formed fastener countersinks, the method comprising:
    placing the fiber reinforced thermoplastic skin on the structure; and
    heat forming the dimple in the fiber reinforced thermoplastic skin with a heated cone-shaped forming tools, wherein the dimple has a cone shape that matches a depth and a taper angle of a cone shape of the previously formed fastener countersink in the structure by forcing the fiber reinforced thermoplastic skin down into and over surfaces of the fastener countersink.

9. The method of claim 8, wherein the forming the dimple includes forming additional dimples, the additional dimples corresponding to additional respective previously formed countersunk holes.

10. The method of claim 9, wherein the heat forming includes:
    heating the forming tools to a melt temperature of the fiber reinforced thermoplastic skin; and
    driving the forming tools into the thermoplastic skin, wherein the heated forming tools does not contact the structure as the dimple is heat formed.

11. The method of claim 10, wherein driving the forming tools into the fiber reinforced thermoplastic skin further includes using the heated forming tools to create an opening in the dimple, wherein the opening is aligned with a respective fastener countersink in the structure and configured to receive a fastener therethrough.

12. The method of claim 10, wherein driving the heated forming tools into the fiber reinforced thermoplastic skin further includes locally spreading reinforcing fibers in the fiber reinforced thermoplastic skin while not cutting the reinforcing fibers.

13. The method of claim 9, further comprising:
    drilling holes in the fiber reinforced thermoplastic skin, wherein heat forming the dimples includes forming the dimples into the holes in the fiber reinforced thermoplastic skin.

14. The method of claim 11, further comprising:
    inserting a fastener through the opening of the dimple and the respective fastener countersink to attach the fiber reinforced thermoplastic skin to the structure.

15. A method of countersinking a thin gauge thermoplastic skin for attachment to an underlying structure with countersunk fasteners, the method comprising:
    heating a cone-shaped forming tool to a melt temperature of the thermoplastic skin;
    placing the thermoplastic skin over the underlying structure;
    forming a dimple in the thermoplastic skin by driving the heated cone-shaped forming tool into the thermoplastic skin to locally melt the thermoplastic skin to locally displace reinforcing fibers in the thermoplastic skin, wherein the dimple extends into and conforms to a shape of an existing fastener countersink previously formed in the underlying structure and wherein the dimple is aligned with a previously formed fastener hole of the fastener countersink; and
    inserting a countersunk fastener through the dimple and the fastener hole to attach the thermoplastic skin to the underlying structure.

16. The method of claim 15, further comprising:
    forming an opening in the dimple with the heated cone-shaped forming tool when driving the heated cone-shaped forming tool into the thermoplastic skin, the opening aligned with the previously formed fastener hole of the fastener countersink and configured to receive the countersunk fastener therethrough.

17. The method of claim 15, further comprising:
drilling a hole through the thermoplastic skin, and
driving the heated cone-shaped forming tool into the thermoplastic skin further includes driving the heated cone-shaped forming tool into the hole.

18. The method of claim 15, wherein driving the heated cone-shaped forming tool into the thermoplastic skin further includes the heated cone-shaped forming tool not contacting the structure.

19. The method of claim 15, wherein the driving the heated cone-shaped forming tool into the thermoplastic skin includes locally spreading reinforcing fibers in the thermoplastic skin while not cutting the reinforcing fibers.

20. The method of claim 15, wherein the forming the dimple includes forming additional dimples, the additional dimples corresponding to additional respective previously formed countersunk holes.

\* \* \* \* \*

UNITED STATES PATENT AND TRADEMARK OFFICE
CERTIFICATE OF CORRECTION

PATENT NO. : 12,151,445 B2
APPLICATION NO. : 17/936117
DATED : November 26, 2024
INVENTOR(S) : Gregory James Schoepen Hickman and Aaron Ross Cowin Page 1 of 1

It is certified that error appears in the above-identified patent and that said Letters Patent is hereby corrected as shown below:

In the Claims

Column 7, Line 66, correct "previously formed fastener countersinks," to read -- previously formed fastener countersink, --.
Column 8, Line 4, correct "cone-shaped forming tools," to read -- cone-shaped forming tool, --.
Column 8, Line 17, correct "heating the forming tools," to read -- heating the forming tool, --.
Column 8, Line 19, correct "driving the forming tools," to read -- driving the forming tool, --.
Column 8, Line 20, correct "heated forming tools," to read -- heated forming tool, --.
Column 8, Line 24, correct "heated forming tools," to read -- heated forming tool, --.

Signed and Sealed this
Fourteenth Day of January, 2025

Derrick Brent
*Acting Director of the United States Patent and Trademark Office*